United States Patent Office 3,046,273
Patented July 24, 1962

3,046,273
NOVEL 17α-TRIFLUORO-PROPYNYL ANDROSTENES AND PROCESSES
John Fried, Plainfield, and Thomas S. Bry, Roselle, N.J., assignors to Merck & Co., Inc., Rahway, N.J., a corporation of New Jersey
No Drawing. Filed Jan. 18, 1961, Ser. No. 83,389
28 Claims. (Cl. 260—239.55)

This invention is concerned generally with novel steroid compounds and processes for preparing the same. More particularly, it relates to novel 21-trifluoromethyl-norethisterones, and the Δ$^{5(10)}$-isomers thereof, starting with 3-methoxy-2,5(10)-androstadiene-17-one, and to closely related compounds.

The compounds prepared by our invention possess useful therapeutic properties as orally and parentally active progestational agents.

In preparing our novel chemical compounds, the starting material utilized is the 3-methoxy-2,5(10)-androstadiene-17-one, which has the following structural formula:

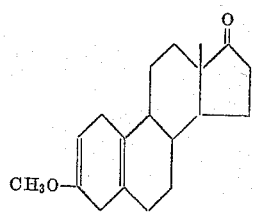

It has been found that the above starting material will react with trifluoropropyne, previously treated with magnesium ethyl bromide, to form the 17α-trifluoropropynyl-3-methoxy-2,5(10)-androstadiene-17β-ol which has the following structural formula:

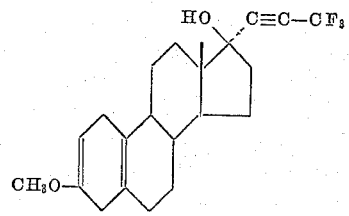

The 17α-trifluoropropynyl-3-methoxy - 2,5(10)-androstadiene-17β-ol is converted into the 17α-trifluoropropynyl-17β-hydroxy-19-nor-4-androstene-3-one (i.e. the 21-trifluoromethyl-norethisterone) which has the following formula.

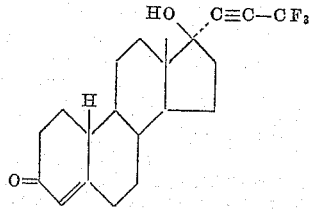

by reaction with a strong mineral acid, such as p-toluenesulfonic acid. For example, a mixture of the steroid and p-toluenesulfonic acid in acetone solution is left standing at room temperature for about 18 hours.

The 17α-trifluoropropynyl-17β-hydroxy-19-nor-4-androstene-3-one is converted into the 17β-alkanoyl ester by reaction with an alkonic acid anhydride or alkonyl halide in the presence of a tertiary amine such as pyridine. The acid anhydrides which may be used for this purpose include acetic anhydride, propionic anhydride, butyric anhydride and the like. The 17β-caproate is prepared by the reaction of the 21β-free alcohol with caproyl halide in the presence of a tertiary amine base.

The 17α-trifluoropropynyl-17β-alkoxy-19-nor-4-androstene-3-one is prepared by reaction of the 17β-hydroxy compound with an alkyl halide and silver oxide in a solvent such as dimethylformamide. The alkyl halides which may be used for this purpose include methyl iodide, ethyl iodide, n-propyl iodide, n-butyl iodide and the like.

The above 17β-hydroxy-, 17β-alkoxy- or 17β-alkanoyloxy-17α-trifluoropropynyl - 19-nor-4-androstene-3-one is hydrogenated to the 17α-(3′,3′,3′-trifluoropropynyl)-17β-hydroxy-19-nor-4-androstene-3-one (I) using a Lindlar catalyst (lead deactivated palladium on a calcium carbonate support), and to the 17α-(3′,3′,3′-trifluoropropyl)-19-nor-4-androstene-3-one (II) using a platinum oxide catalyst.

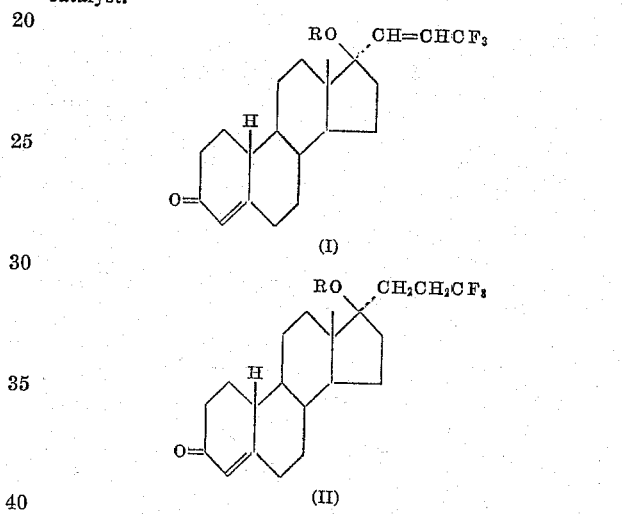

wherein R is hydrogen, alkoxy or alkanoyloxy.

The 3-enol ethers of the 17α-trifluoropropynyl-17β-hydroxy-19-nor-4-androstene-3-one, i.e. the 3-alkoxy-17α-trifluoropropynyl-19-nor-3,5-androstadiene-17β-ols, which have the following formula:

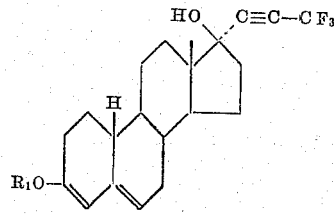

wherein $R_1$ stands for an alkyl group, are prepared by stirring together a mixture of the steroid and an alkyl orthoformate in dioxane solution in the presence of a strong acid catalyst such as mineral acid, or an organic sulfonic acid. In the reaction, the 17β-alkoxy- or the 17β-alkanoyloxy derivative may be used in place of the 17β-hydroxy-compound to obtain the corresponding 17β-alkoxy- or 17β-alkanoyloxy derivatives.

In a preferred embodiment of our invention, the novel 3-enol ethyl ether of the 17α-trifluoropropynyl-17β-hydroxy-19-nor-4-androstene-3-one is prepared by adding ethyl orthoformate and p-toluenesulfonic acid to a solution of the steroid in dioxane and stirring together at room temperature. The acid catalyst is then neutralized with a base such as pyridine. The 3-enol n-butyl ether of the 17α-trifluoropropynyl-17β - hydroxy-19-nor-4-androstene-3-one is prepared by stirring together a mixture of the steroid and n-butyl orthoformate and 2,4-dinitrobenzenesulfonic acid in dioxane solution overnight at about 30° C. The acid catalyst is then neutralized with a base such as pyridine.

The 6-chloro-17α-trifluoropropynyl-17β-hydroxy- (17β-alkoxy- or 17β-alkanoyloxy)-19-nor-4,6-androstadiene-3-one is prepared from the 3-enol ethyl ether of the 17α-trifluoropropynyl-17β-hydroxy-17β-alkoxy- or 17β-alkanolyoxy)19-nor-4-androstene-3-one by reaction first with N-bromo-succinimide to give the 6β-bromo-17α-trifluoropropynyl-17β-hydroxy-(17β-alkoxy- or 17β-alkanoyloxy)-19-nor-4-androstene-3-one which has the following formula:

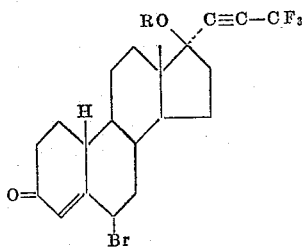

wherein R represents hydrogen, alkoxy or alkanoyloxy.

In a preferred embodiment of our invention, a solution of the steroid and sodium acetate in aqueous acetone is stirred with N-bromosuccinimide and acetic acid at about 0° C.

The 6-bromo-derivative is then dehydrogenated at Δ⁶, to form the 17α-trifluoropropynyl-17β-hydroxy-(17β-alkoxy- or 17β-alkanoyloxy) - 19 - nor-4,6-androstadiene-3-one which has the structure:

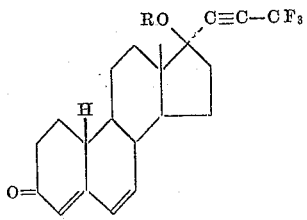

wherein R is hydrogen, alkoxy or alkanoyloxy. The dehydrogenation is brought about by heating a solution of the steroid in a solvent such as dimethylformamide with lithium bromide and lithium carbonate for several hours at about 120° C.

The above compound is then oxidized to the 6α,7α-epoxy - 17α - trifluoropropynyl-17β-hydroxy-(17β-alkoxy- or 17β-alkanoyloxy)-19-nor-4-androstene-3-one which has the following structure:

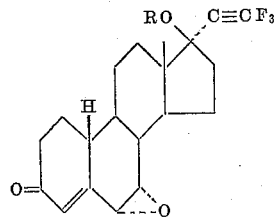

wherein R is hydrogen, alkoxy or alkanoyloxy, suitably by treating a solution of the steroid in a solvent such as benzene with perbenzoic acid in the dark at room temperature for about 60–70 hours.

A solution of 6α,7α-epoxy-17α-trifluoropropynyl-17β-hydroxy - (17β-alkoxy- or 17β-alkanoyloxy)-19-nor-4-androstene-3-one in an organic solvent is treated with HCl at room temperature to form the 6-chloro-17α-trifluoropropynyl - 17β - hydroxy-(17β-alkanoxy- or 17β-alkanoyl-oxy)-19-nor-4,6-androstadiene-3-one which has the following formula:

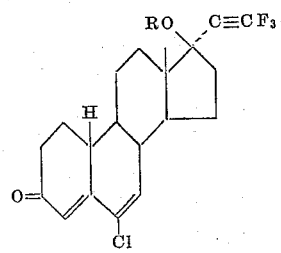

wherein R is hydrogen, alkoxy or alkanoyloxy.

The 17α-trifluoropropynyl - 3 - methoxy-2,5(10)-androstadiene - 17β - ol is converted into the 17α-trifluoropropynyl-17β-hydroxy-5(10)-androstene-3-one which has the following formula:

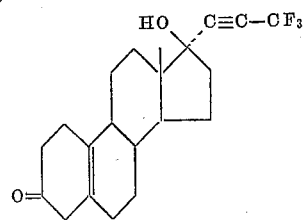

by reaction with a weak organic acid such as acetic acid. For example, a mixture of the steriod and glacial acetic acid in an aqueous solution of absolute ethanol and dioxane is left standing at room temperature for several hours.

The 17α-trifluoropropynyl - 17β - hydroxy-4,9-androstadiene-3-one which has the following formula:

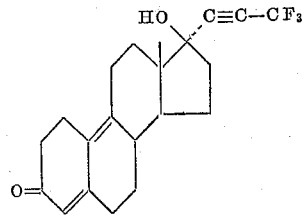

is prepared by the reaction of 17α-trifluoropropynyl-17β-hydroxy-5(10)-androstene-3-one, with approximately one equivalent of bromine in pyridine solution, or with pyridine perbromide hydrobromide.

The 17α-trifluoropropynyl - 17β - hydroxy-4,9-androstadiene-3-one is converted into the 17β-alkanoyl ester by reaction with an alkanoic acid anhydride or alkanoyl halide in the presence of a tertiary amine such as pyridine, and into the 17β-alkoxy derivative by reaction with an alkyl halide and silver oxide in a solvent such as dimethylformamide.

The following examples illustrate methods of carrying out the present invention but it is to be understood that these examples are given for purposes of illustration and not of limitation.

*Example 1*

A 50 cc. three-neck round bottom flask is fitted with a Dry-Ice condenser, a dropping funnel and a magnetic stirrer. After the addition of 210 mg. of magnesium, the entire system is swept with nitrogen and flame dried. Five cc. of dry ether is added to the magnesium and 1 cc. of ethyl bromide in 5 cc. of ether is added dropwise with stirring over 15 minutes. After all the magnesium has reacted, 5 cc. of trifluoropropyne (prepared by the reaction of propiolic acid with sulfur tetrafluoride) is distilled in and refluxed under Dry-Ice-acetone for one hour. The reaction is then allowed to warm to room temperature, the excess gaseous trifluoropropyne being distilled off. A solution of 500 mg. of 3-methoxy-2,5(10)-androstadiene-17-one which is dried by azeotropic distillation from benzene, is added in 5 cc. of benzene and 5 cc. of dry ether.

The reaction is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of 8 parts petroleum ether and 2 parts ether to give 410 mg. of 17α-trifluoropropynyl-3-methoxy-2,5(10)-androstadiene-17β-ol.

*Example 2*

To 150 mg. of the product obtained in Example 1, in 15 cc. of acetone is added 15 mg. of paratoluenesulfonic acid. This mixture is allowed to stand for 18 hours at room temperature, and is then poured into ice water and extracted with ether. The organic extracts are washed to neutrality with water, dried over sodium sulfate and concentrated in vacuo. The residue is chromatographed on 5 g. of acid-washed alumina by charging with benzene and eluting with 6 parts of a mixture of petroleum ether with 4 parts of ether. Recrystallization from a mixture of petroleum ether and ether affords 42 mg. of 17α-trifluoropropynyl-17β-hydroxy-19-nor-4-androstene-3-one, M.P. 128–132° C., I.R. $\lambda_{max.}^{Neat}$ 2.95, 4.45, 6.05, 6.20μ, U.V. $\lambda_{max.}^{MeOH}$ 238, ε 15,000; $[\alpha]_D^{26}$ C.—21.0CHCL$_3$, C, 1.0.

*Example 3*

One-hundred mg. of 17α-trifluoropropynyl-17β-hydroxy-19-nor-4-androstene-3-one is heated with 1 cc. of acetic anhydride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether and petroleum ether to give 17β-acetoxy-17α-trifluoropropynyl-19-nor-4-androstene-3-one.

*Example 4*

One-hundred mg. of 17α-trifluoropropynyl-17β-hydroxy-19-nor-4-androstene-3-one is heated with 1 cc. of caproyl chloride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether and petroleum ether to give 17β-caproyloxy-17α-trifluoropropynyl-19-nor-4-androstene-3-one.

*Example 5*

A mixture of 500 mg. of 17α-trifluoropropynyl-17β-hydroxy-19-nor-4-androstene-3-one, 10 ml. of dimethylformamide, 20 ml. of methyl iodide, and 1.5 gms. of silver oxide is stirred at room temperature for 4 days, an additional ½ gm. of silver oxide being added at the end of each day. One-hundred ml. of chloroform is then added to the reaction mixture and the mixture is stirred for one hour and filtered. The filtrate is evaporated to dryness and the residual oil is chromatographed over acid-washed alumina and eluted with mixtures of ether and petroleum ether to give 17α-trifluoro-propynyl-17β-methoxy-19-nor-4-androstene-3-one.

*Example 6*

A mixture of 500 mg. of 17α-trifluoropropynyl-17β-hydroxy-19-nor-4-androstene-3-one, 10 ml. of dimethylformamide, 20 ml. of methyl iodide, and 1.5 gms. of silver oxide is stirred at room temperature for 4 days, an additional ½ gm. of silver oxide being added at the end of each day. One-hundred ml. of chloroform is then added to the reaction mixture and the mixture is stirred for one hour and filtered. The filtrate is evaporated to dryness and the residual oil is chromatographed over acid-washed alumina and eluted with mixtures of ether and petroleum ether to give 17α-trifluoro-propynyl-17β-ethoxy-19-nor-4-androstene-3-one.

*Example 7*

A solution of 100 mg. of 17α-trifluoropropynyl-17β-hydroxy-19-nor-4-androstene-3-one and 50 mg. of Lindlar catalyst (lead deactivated palladium on a calcium carbonate support) in 10 cc. of ethyl acetate is treated with hydrogen until one mole of hydrogen has been absorbed. The mixture is filtered and concentrated. Chromatography of the crude product yields the 17α-(3',3',3'-trifluoropropenyl)-17β-hydroxy-19-nor-4-androstene-3-one.

In accordance with the above procedures, but starting with the 17β-methoxy- or the 17β-acetoxy-17α-trifluoropropynyl-19-nor-4-androstene-3-one in place of the 17α-trifluoropropynyl-17β-hydroxy-19-nor-4-androstene-3-one there is obtained the corresponding 17β-methoxy- or the 17β-acetoxy - 17α-(3',3',3' - trifluoropropenyl)-19-nor-4-androstene-3-one.

*Example 8*

A suspension of platinum oxide in 10 cc. of ethanol is reduced and 100 mg. of 17α-trifluoropropynyl-17β-hydroxy-19-nor-4-androstene-3-one is added. Reduction is allowed to proceed until two moles of hydrogen have been absorbed. The solution is filtered, concentrated and chromtographed on alumina to yield the 17α-(3',3',3'-trifluoropropyl)-17β-hydroxy-19-nor-4-androstene-3-one.

In accordance with the above procedures, but starting with the 17β-acetoxy- or the 17β-methoxy-17α-trifluoropropynyl-19-nor-4-androstene-3-one in place of the 17α-trifluoropropynyl-17β-hydroxy-19-nor - 4 - androstene-3-one there is obtained the corresponding 17β-acetoxy- or the 17β-methoxy-17α-(3',3',3'-trifluoropropyl)-19-nor-4-androstene-3-one.

*Example 9*

To a solution of 100 mg. of 17α-trifluoropropynyl-17β-hydroxy-19-nor-4-androstene-3-one in 3 cc. of dioxane is added 2 cc. of ethyl orthoformate and 10 mg. of p-toluene-sulfonic acid. The reaction mixture is stirred at room temperature for 3 hours and 1 cc. of pyridine is added, followed by the dropwise addition of 5 cc. of water. The aqueous phase is separated and extracted with benzene. The organic extracts are washed with a sodium bicarbonate solution and then with water until the washings are neutral. The organic phase is dried over sodium sulfate and concentrated in vacuo to give 3-ethoxy-17α - trifluoropropynyl-19-nor-3,5-androstadiene-17β-ol.

In accordance with the above procedures, but starting with the 17β-acetoxy- or the 17β-methoxy-17α-trifluoropropynyl-19-nor-4-androstene-3-one in place of the 17α-trifluoropropynyl-17β-hydroxy-19-nor-4-androstene-3- one there is obtained as products the corresponding 17β-acetoxy- or the 17β-methoxy-3-ethoxy-17α-trifluoropropynyl-19-nor-3,5-androstadiene.

*Example 10*

A mixture of 100 mg. of 17α-trifluoropropynyl-17β-hydroxy-19-nor-4-androstene-3-one, 0.06 g. of 2,4-dinitrobenzenesulfonic acid, 3 ml. of dry dioxane and 0.25 ml. of freshly distilled n-butyl orthoformate are stirred overnight at 30° C. The acid catalyst is then neutralized by addition of 0.1 ml. of pyridine. The reaction mixture is diluted with water and extracted with ether. The combined ether extracts are washed with water, dried and evaporated under reduced pressure. The residue is chromatographed over alumina (alkaline) and diluted with mixtures of ether and petroleum ether to separate substantially pure 3-n-butoxy-17α-trifluoropropynyl-19-nor-3,5-androstadiene-17β-ol.

In accordance with the above procedures, but starting with the 17β-acetoxy- or the 17β-methoxy-17α-trifluoropropynyl-19-nor-4-androstene-3-one in place of the 17α-trifluoropropynyl-17β-hydroxy-19-nor - 4 - androstene-3- one there is obtained the corresponding 17β-acetoxy- or the 17β-methoxy-3-n-butoxy - 17α - trifluoropropynyl-19-nor-3,5-androstadiene.

Example 11

A solution consisting of 1 g. of 3-ethoxy-17α-trifluoropropynyl-19-nor-3,5-androstadiene-17β-ol, 700 mg. of sodium acetate, 5 ml. of water and 40 ml. of acetone is cooled to 0° C. and 1.07 g. of N bromosuccinimide and 0.83 ml. of acetic acid is added. The mixture is stirred for 3 hours at 0.5° C. and then poured into water to yield the 6β-bromo-17α-trifluoropropynyl-17β - hydroxy - 19-nor-4-androstene-3-one.

Treatment of 6β-bromo-17α-trifluoropropynyl-17β-hydroxy19-nor-4-androstene-3-one (1.0 g.) with 1.0 g. of lithium bromide, 500 mg. of lithium carbonate and 20 ml. of dimethylformamide for 5 hours at 120° C. followed by dilution with ice water and filtration affords 17α-trifluoropropynyl-17β-hydroxy-19-nor-4,6 - androstadiene-3-one.

A solution consisting of 675 mg. of 17α-trifluoropropnyl-17β-hydroxy-19-nor-4,6-androstadiene - 3 - one, 30 ml. of 0.2 N perbenzoic acid dissolved in benzene, and 30 ml. of ether is allowed to stand at room temperature in the dark for 68 hours. The product is washed with acidified sodium bisulfite solution, water, 2.5 N potassium hydroxide solution and water. The material is dried and concentrated in vacuo.

The crude 6α,7α-epoxy-17α-trifluoropropynyl-17β - hydroxy-19-nor-4-androstene-3-one is used directly in the next step.

The 6α,7α-epoxy-17α-trifluoropropynyl-17β - hydroxy-19-nor-4-androstene-3-one, dissolved in 20 ml. of 0.4 N hydrochloric acid in chloroform, is allowed to stand for 5.5 hours at room temperature, and then subsequently poured into iced sodium bicarbonate solution. The product is extracted with chloroform, dried, and concentrated in vacuo. Chromatography on acid-washed alumina (20 g.) and elution with ether-petroleum ether mixtures affords the 6-chloro-17α-trifluoropropynyl-17β - hydroxy-19-nor-4,6-androstadiene-3-one.

In accordance with the above procedures, but starting with the 17β-acetoxy- or the 17β-methoxy-3-ethoxy-17α-trifluoropropynyl-19-nor-3,5-androstadiene in place of the 3-ethoxy-17α-trifluoropropynyl-19-nor-3,5 - androstadiene there is obtained the corresponding 17β-acetoxy- or 17β-methoxy-6-chloro-17α-trifluoropropynyl - 19 - nor - 4,6-androstadiene-3-one.

Example 12

To 410 mg. of 17α-trifluoropropynyl-3-methoxy - 2, 5(10)-androstadiene-17β-ol in 4.1 cc. of dioxane and 18.45 cc. of absolute ethanol is added 8.2 cc. of glacial acetic acid in 4.1 cc. of water. This reaction mixture is left stirring at room temperature for 5 hours. It is then poured into an ice-sodium bicarbonate solution and extracted with benzene. The benzene extract is washed with water until the washings are just slightly basic, dried over sodium sulfate and concentrated in vacuo. The crude product (344 mg.) is chromatographed on 13 g. of neutral (ethyl acetate washed) alumina by charging with a mixture of 1 part benzene and 1 part petroleum ether, and eluting with mixtures of 8 parts petroleum ether:2 parts ether and 7 parts petroleum ether:3 parts ether. Recrystallization from a mixture of ether-petroleum ether affords 167 mg. of 17α-trifluoropropynyl-17β-hydroxy-19-nor-5(10)androstene - 3 - one, M.P. 137–140° C., I.R. $\lambda_{max}^{KBr}$ 2.92, 4.51, 5.8–5.85, 6.01, 7.85, 8.6–8.85μ

$[\alpha]_D^{27°\,C.}$+10.1 dioxane, C, 1.0.

Calculated for $C_{21}H_{25}O_2F_3$: C, 68.85; H, 6.88; F, 15.56. Found: C, 68.77; H, 7.00; F, 17.3.

Example 13

To 100 mg. of 17α-trifluoropropynyl-17β - hydroxy-5(10)-androstene-3-one in 5 cc. of pyridine is added one equivalent of bromine. The reaction is stirred for two hours at room temperature, poured into ice-water and extracted with ether. The ether extract is washed with water, dried over sodium sulfate, and concentrated in vacuo to yield 17α-trifluoropropynyl-17β-hydroxy-19-nor-4,9-androstadiene-3-one.

Example 14

One-hundred mg. of 17α-trifluoropropynyl-17β - hydroxy-19-nor-4,9-androstadiene-3-one is heated with 1 cc. of acetic anhydride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether and petroleum ether to give 17β-acetoxy-17α-trifluoropropynyl19-nor-4,9 - androstadiene - 3-one.

Example 15

A mixture of 500 mg. of 17α-trifluoropropynyl-17β-hydroxy-19-nor-4,9-androstadiene-3-one, 10 ml. of dimethylformamide, 20 ml. of methyl iodide, and 1.5 gms. of silver oxide is stirred at room temperature for 4 days, an additional ½ gm. of silver oxide being added at the end of each day. One-hundred ml. of chloroform is then added to the reaction mixture and the mixture is stirred for one hour and filtered. The filtrate is evaporated to dryness and the residual oil is chromatographed over acid-washed alumina and eluted with mixtures of ether and petroleum ether to give 17α-trifluoropropynyl-17β-methoxy-19-nor-4,9-androstadiene-3-one.

Various changes and modifications may be made in carrying out the present invention without departing from the spirit and scope thereof. Insofar as these changes and modifications are within the purview of the annexed claims, they are to be considered as part of our invention.

We claim:
1. 17α - trifluoropropynyl - 3 - methoxy - 2,5(10) - androstadiene - 17β - ol.
2. 17α - trifluoropropynyl - 17β - hydroxy - 5(10) - androstene - 3 - one.
3. 17α - trifluoropropynyl - 17β - hydroxy - 19 - nor- 4 - androstene - 3 - one.
4. 17β - acetoxy - 17α - trifluoropropynyl - 19 - nor - 4- androstene - 3 one.
5. 17β - caproyloxy - 17α - trifluoropropynyl - 19 - nor- 4 - androstene - 3 - one.
6. 17α - trifluoropropynyl - 17β - methoxy - 19 -nor- 4 - androstene - 3 - one.
7. 17β - ethoxy - 17α - trifluoropropynyl - 19 - nor - 4- androstene - 3 - one.
8. A compound selected from the group consisting of 17α - (3',3',3' - trifluoropropenyl) - 17β - hydroxy - 19- nor 4 - androstene - 3 - one and the 17β-alkoxy ethers and 17β-alkanoyl esters thereof.
9. A compound selected from the group consisting of 17α - (3',3',3' - trifluoropropyl) - 17β - hydroxy - 19 - nor- 4 - androstene - 3 - one and the 17β-alkoxy ethers and 17β-alkanoyl esters thereof.
10. A compound selected from the group consisting of 3 - alkoxy - 17α - trifluoropropynyl - 19 - nor - 3,5 - androstadiene - 17β - ol and the 17β-alkoxy ethers and the 17β-alkanoyl esters thereof.
11. 3 - ethoxy - 17α - trifluoropropynyl - 19 - nor - 3,5- androstadiene - 17β - ol.
12. 3 - butoxy - 17α - trifluoropropynyl - 19 - nor - 3,5- androstadiene - 17β - ol.
13. 6β - bromo - 17α - trifluoropropynyl - 17β - hydroxy - 19 - nor - 4 - androstene - 3 - one.
14. 17α - trifluoropropynyl - 17β - hydroxy - 19 -nor-4,6 - androstadiene - 3 - one.
15. 6α,7α - epoxy - 17α - trifluoropropynyl - 17β - hydroxy - 19 - nor- 4 - androstene - 3 - one.

16. A compound selected from the group consisting of 6 - chloro - 17α - trifluoropropynyl - 17β - hydroxy- 19 - nor - 4,6 - androstadiene - 3 - one and the 17β-alkoxy ethers and the 17β-alkanoyl esters thereof.

17. A compound selected from the group consisting of 17α - trifluoropropynyl - 17β - hydroxy - 19 - nor - 4,9-androstadiene - 3 - one and the 17β-alkoxy ethers and the 17β-alkanoyl esters thereof.

18. Process for the preparation of 17α - trifluoropropynyl - 3 - methoxy - 2,5(10) - androstadiene - 17β - ol which comprises reacting 3 - methoxy - 2,5(10) - androstadiene-17-one with trifluoropropyne which has been previously treated with magnesium ethyl bromide.

19. Process for the preparation of 17α - trifluoropropynyl - 17β - hydroxy - 19 - nor - 4 - androstene - 3 - one which comprises reacting 17α - trifluoropropynyl - 3 - methoxy - 2,5(10) - androstadiene - 17β - ol with a strong acid.

20. Process for the preparation of 3 - alkoxy - 17α -trifluoropropynyl - 19 - nor - 3,5 - androstadiene - 17β - ol which comprises reacting 17α - trifluoropropynyl - 17β-hydroxy - 19 - nor - 4 - androstene - 3 - one with an alkyl orthoformate in dioxane solution in the presence of a strong acid catalyst.

21. Process for the preparation of 17β - alkanoyloxy- 17α - trifluoropropynyl - 19 - nor - 4 - androstene - 3 - one which comprises reacting 17α - trifluoropropynyl - 17β-hydroxy - 19 - nor - 4 - androstene - 3 - one with a compound selected from the group consisting of alkanoyl acid anhydrides and alkanoyl halides in the presence of a tertiary amine.

22. Process for the preparation of 17α - trifluoropropynyl - 17β - alkoxy - 19 - nor - 4 - androstene - 3 - one which comprises reacting a solution of 17α - trifluoropropynyl - 17β - hydroxy - 19 - nor - 4 - androstene - 3 - one in an organic solvent with an alkyl halide and silver oxide.

23. Process for the preparation of 6β - bromo - 17α-trifluoropropynyl - 17β - hydroxy - 19 - nor - 4 - androstene-3-one which comprises reacting a solution of 17α-trifluoropropynyl - 17β - hydroxy - 19 - nor - 4 - androstene-3-one in an organic solvent with N-bromosuccinimide in the presence of acetic acid and sodium acetate.

24. Process for the preparation of 17α - trifluoropynyl - 17β - hydroxy - 19 - nor - 4,6 - androstadiene - 3- one comprising heating a solution of 6β - bromo - 17α-trifluoropropynyl - 17β - hydroxy - 19 - nor - 4 - androstene-3-one in an organic solvent with lithium bromide and lithium carbonate.

25. Process for the preparation of 6α,7α - epoxy - 17α-trifluoropropynyl - 17β - hydroxy - 19 - nor - 4 - androstene - 3 - one comprising oxidizing 17α - trifluoropropynyl - 17β - hydroxy - 19 - nor - 4,6 - androstadiene - 3-one with perbenzoic acid.

26. Process for the preparation of 6 - chloro - 17α-trifluoropropynyl - 17β - hydroxy - 19 - nor - 4,6 - androstadiene-3-one comprising treating a solution of 6α,7α-epoxy - 17α - trifluoropropynyl - 17β - hydroxy - 19 -nor- 4 - androstene - 3 - one with hydrogen chloride.

27. Process for the preparation of 17α - trifluoropropynyl - 17β - hydroxy - 5(10) - androstene - 3 - one which comprises reacting 17α - trifluoropropynyl - 3 - methoxy- 2,5(10) - androstadiene - 17β - ol with a weak acid.

28. Process for the preparation of 17α - trifluoropropynyl - 17β - hydroxy - 19 - nor - 4,9 - androstadiene - 3-one which comprises treating 17α - trifluoropropynyl- 17β - hydroxy - 5(10) - androstene - 3 - one with approximately one equivalent weight of bromine in pyridine solution.

References Cited in the file of this patent

Journal of the American Chemical Society, March 5, 1960, vol. 82, pages 1230–1235, Knox et al.

Journal Chemical Society, June 1960, pages 2389–2391, Ellis et al.